(12) United States Patent
Liao et al.

(10) Patent No.: US 8,292,515 B2
(45) Date of Patent: Oct. 23, 2012

(54) OPTICLA FIBER CONNECTOR ASSEMBLY WITH GUIDING MEANS

(75) Inventors: Chi-Nan Liao, Tu-Cheng (TW); Chun-Fu Lin, Tu-Cheng (TW)

(73) Assignee: Hon Hai Precision Ind. Co., Ltd, New Taipei (TW)

( * ) Notice: Subject to any disclaimer, the term of this patent is extended or adjusted under 35 U.S.C. 154(b) by 93 days.

(21) Appl. No.: 12/834,021

(22) Filed: Jul. 12, 2010

(65) Prior Publication Data
US 2011/0008004 A1 Jan. 13, 2011

(30) Foreign Application Priority Data

Jul. 10, 2009 (TW) .................................. 98212676

(51) Int. Cl.
G02B 6/32 (2006.01)
G02B 6/38 (2006.01)
G02B 6/26 (2006.01)

(52) U.S. Cl. ............................... 385/74; 385/52; 385/93
(58) Field of Classification Search ..................... 385/74
See application file for complete search history.

(56) References Cited

U.S. PATENT DOCUMENTS

| 5,241,612 A * | 8/1993 | Iwama ............................. 385/74 |
| 6,287,017 B1 * | 9/2001 | Katsura et al. .................. 385/59 |
| 7,031,567 B2 | 4/2006 | Grinderslev et al. |

* cited by examiner

*Primary Examiner* — Michelle R Connelly
(74) *Attorney, Agent, or Firm* — Wei Te Chung; Ming Chieh Chang

(57) ABSTRACT

An optical fiber connector assembly includes a first connector and a second connector. The first connector includes two pairs of first convex lenses projecting from a front mating face thereof and a pair of cone-shaped positioning posts at sides of the pairs of convex lenses respectively. The second connector includes two pairs of second convex lenses projecting from a second front mating face thereof to couple with the first convex lenses and a pair of positioning holes to be inserted with the positioning posts of the first connector. Each of the positioning holes includes a retention section and a guiding section in front of the retention section, and the retention sections is same to the positioning posts while the guiding sections is larger than the position posts in dimension.

7 Claims, 6 Drawing Sheets

OPTICLA FIBER CONNECTOR ASSEMBLY WITH GUIDING MEANS

BACKGROUND OF THE INVENTION

1. Field of the Invention

The present invention relates to an optical fiber connector, and more particularly to an optical fiber connector adapted for usage in an optoelectronic socket.

2. Description of the Related Art

U.S. Pat. No. 7,031,567 issued to Grinderslev et al. on Apr. 18, 2006 discloses an electronic-optical transform system. The system includes a first optical lens and a second optical lens which are placed against each other. A plurality of optical fibers couples with the first and second optical lens. The optical signal transferred by the optical fiber is amplified by the first optical lens. Afterwards, the amplified optical signal is minified by the second optical lens. The first and second optical lenses prevent optical signal reduction. However, the system does not disclose the positioning members. And the positioning members will directly affect accuracy of the signal transmission.

Hence, an improved optical fiber connector assembly is desired to overcome the disadvantages of the prior art.

BRIEF SUMMARY OF THE INVENTION

Therefore, an object of the present invention is to provide an optical fiber connector assembly with guiding means.

To fulfill the above-mentioned object, an optical fiber connector assembly comprises a first connector and a second connector. The first connector comprises two pairs of first convex lenses projecting from a front mating face thereof and a pair of cone-shaped positioning posts at sides of the pairs of convex lenses respectively. The second connector comprises two pairs of second convex lenses projecting from a second front mating face thereof to couple with the first convex lenses and a pair of positioning holes to be inserted with the positioning posts of the first connector. Each of the positioning holes comprises a retention section and a guiding section in front of the retention section, and the retention sections is same to the positioning posts while the guiding sections is larger than the position posts in dimension.

Other objects, advantages and novel features of the invention will become more apparent from the following detailed description when taken in conjunction with the accompanying drawings.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE PREFERRED EMBODIMENT

Figure 1:
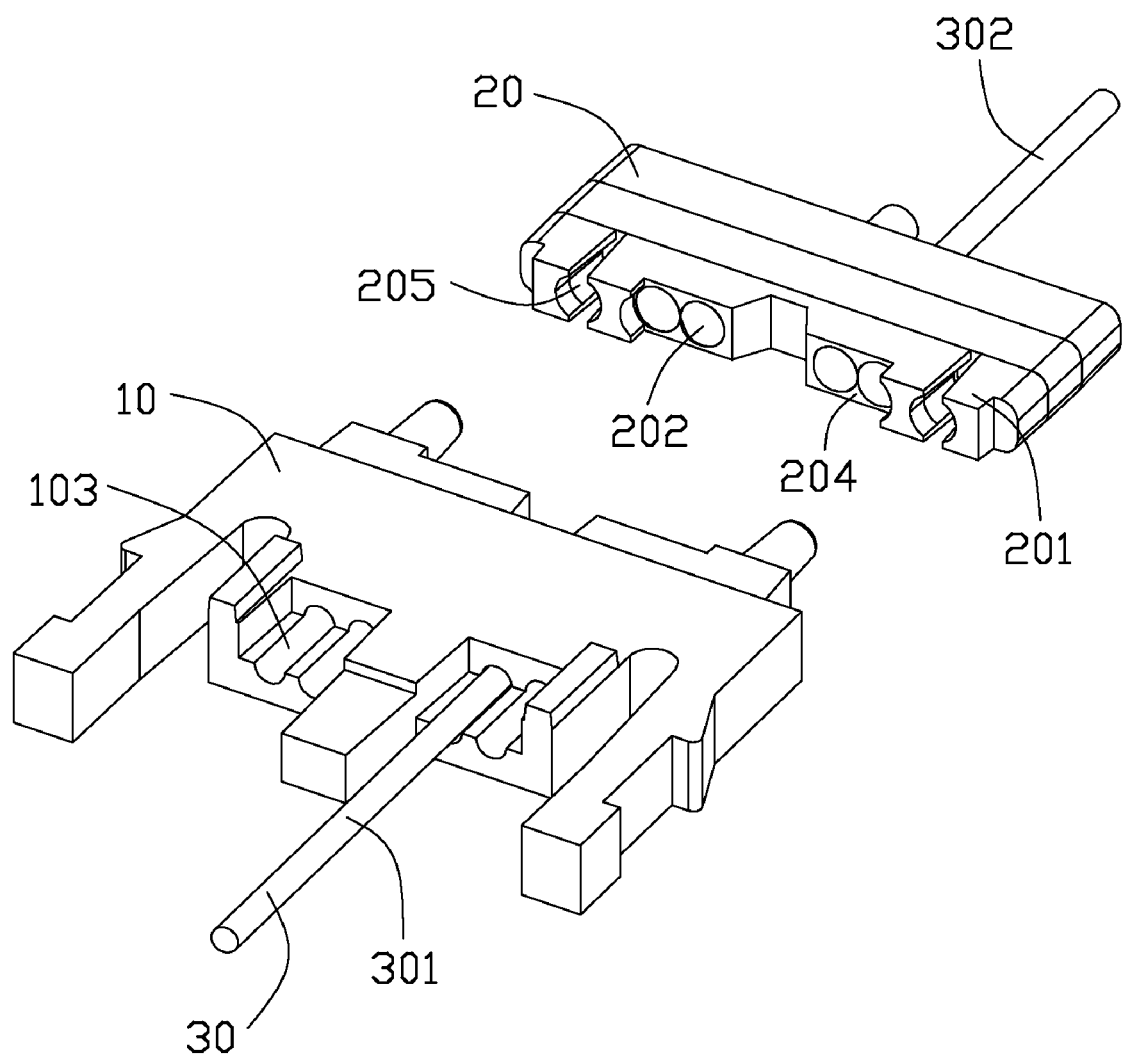
FIG. 1 is a perspective view of an optical fiber connector assembly made in accordance with the present invention.

Reference will now be made in detail to the preferred embodiment of the present invention.

With reference to FIGS. 1-6, an optical fiber connector assembly in accordance with the present invention, includes a first connector 10, a second connector 20 mating with each other and a plurality of optical fibers 30 attached to the connectors which transmit optical signals. The first fibers 301 and the second fibers 302 is coupled with the first and second connector 10, 20, respectively.

Figure 2:
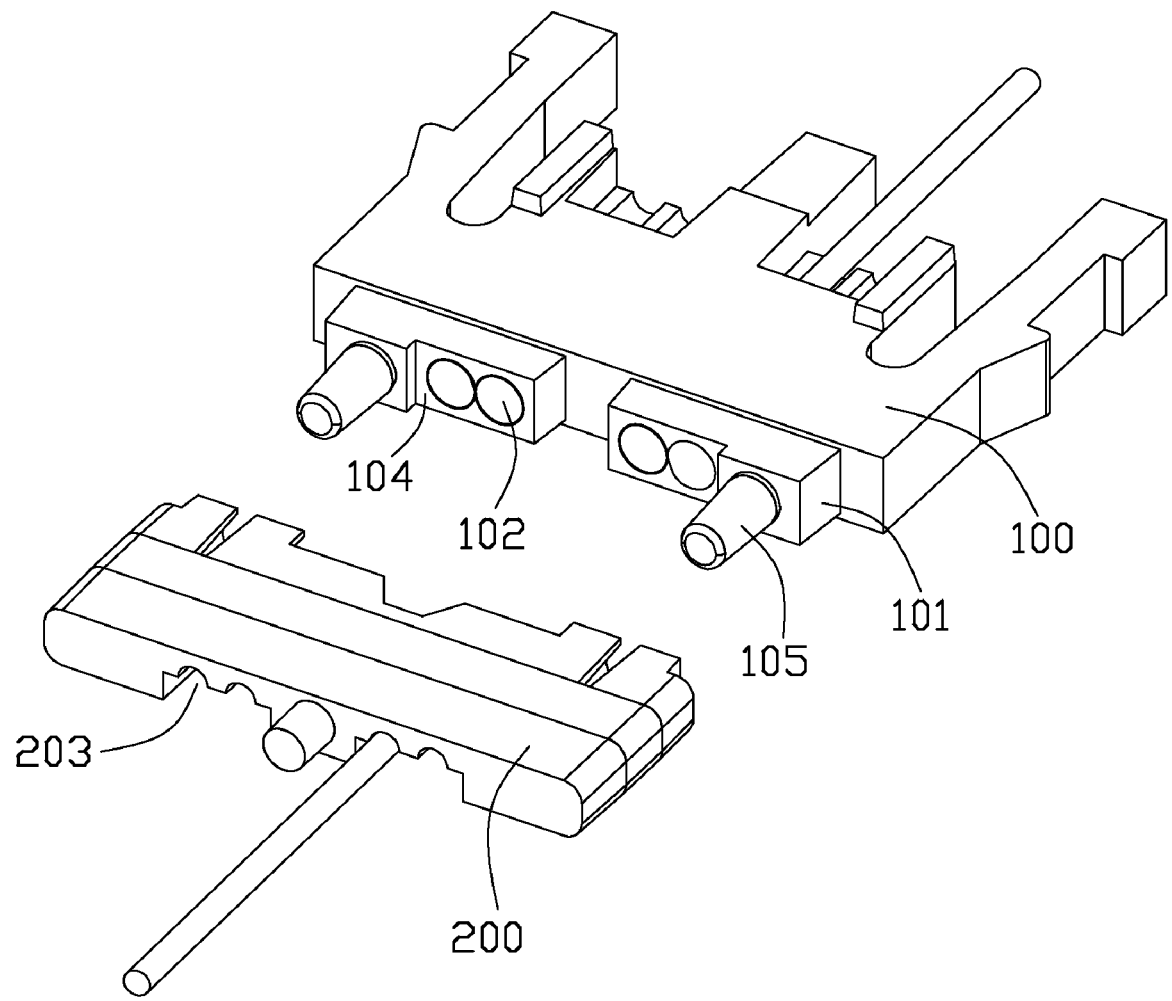
FIG. 2 is a perspective view of the optical fiber connector assembly from another aspect shown in FIG. 1.
Figure 3:
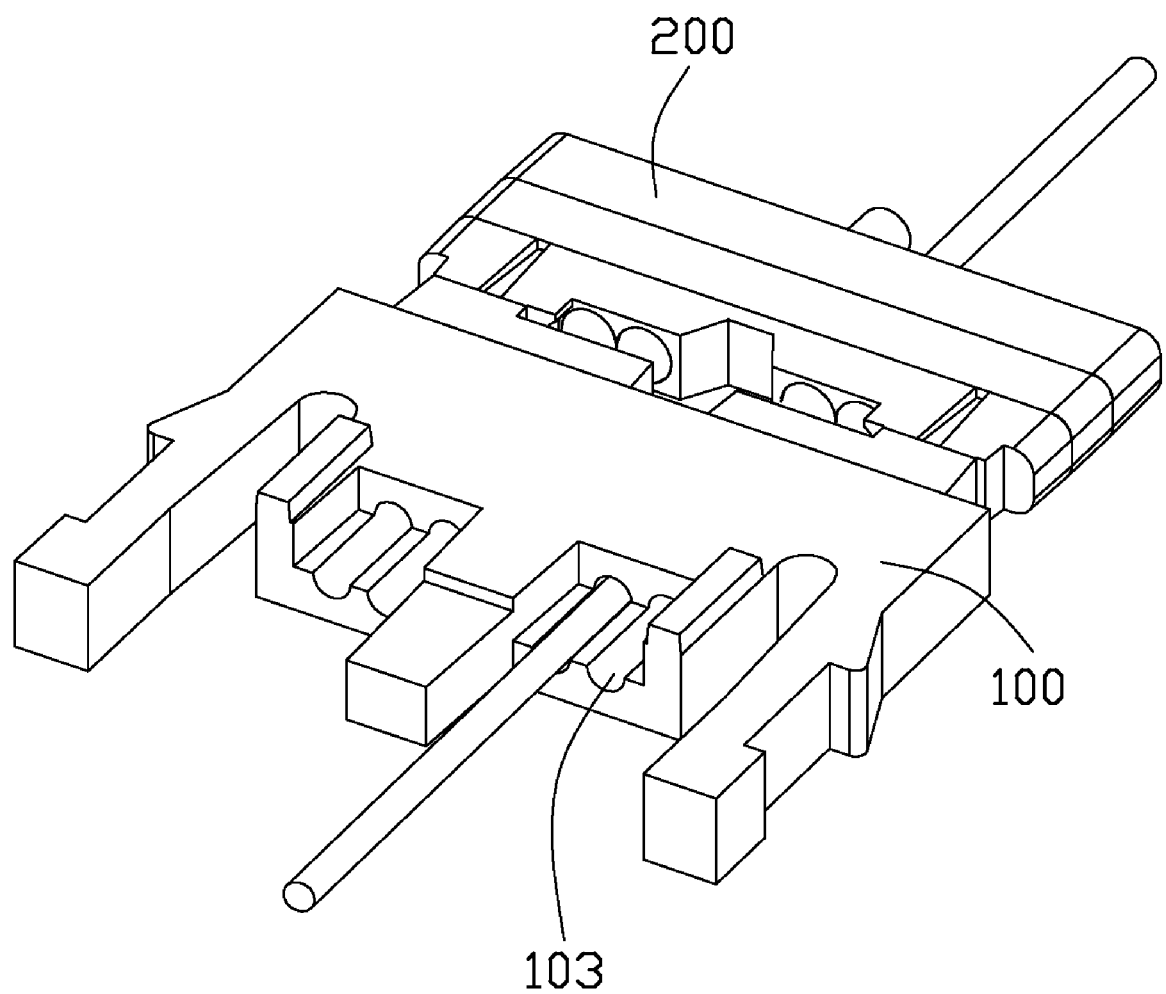
FIG. 3 is a perspective view of the optical fiber connector assembly after assembled together shown in FIG. 1.

Together referring to FIGS. 1 and 2, the first connector 10 has a first mating portion 101 defined on a front end of a base portion 100 thereof. The mating portion 101 has two pairs of first convex lenses 102 with non-spherical headers forward protruding from a first mating face 104 of the first mating portion 101 (best shown in FIG. 4) and a pair of positioning posts 105. The first convex lenses 102 diverges rays of light from the first fibers 301 to the second lenses 202 of the second connector. Meanwhile, the optical signal is amplified by the first convex lenses 102. The pair of cone-shaped positioning posts 105 protrudes forwards from a front faces at outer sides of the first lenses 102 to cooperate with the second connector 20. The positioning posts 105 taper towards distal ends thereof. The front face from which the positioning posts extend, projects forward beyond the front mating face 104 from which the first lenses project. Two pairs of first grooves 103 are defined on a rear recessed end which is opposite to the mating portion 101 of the first connector 10 to hold one end of the first fiber 301.

The second connector 20 has a second mating portion 201 defined on a front end of a second base portion 200 thereof. Two pairs of second convex lenses 202 with non-spherical headers forwards protrude from a second mating face 204 of the second mating portion 201. Each second convex lens 202 is adapted for receiving the optical signal amplified by corresponding first convex lens 102, and then the optical signal is minified thereby and transferred in the second fiber 302. A pair of positioning holes 205 is defined in the opposite sides of the second lenses to mate with the positioning posts 105 of the first connector 10. Two pairs of grooves 203 are defined on a recessed rear end opposite to the mating portion of the second connector 20 to hold distal ends of the second fiber 302. The front face from which the positioning holes recessed is located forward beyond the front mating face 204 from which the second lenses extend.

Figure 5:
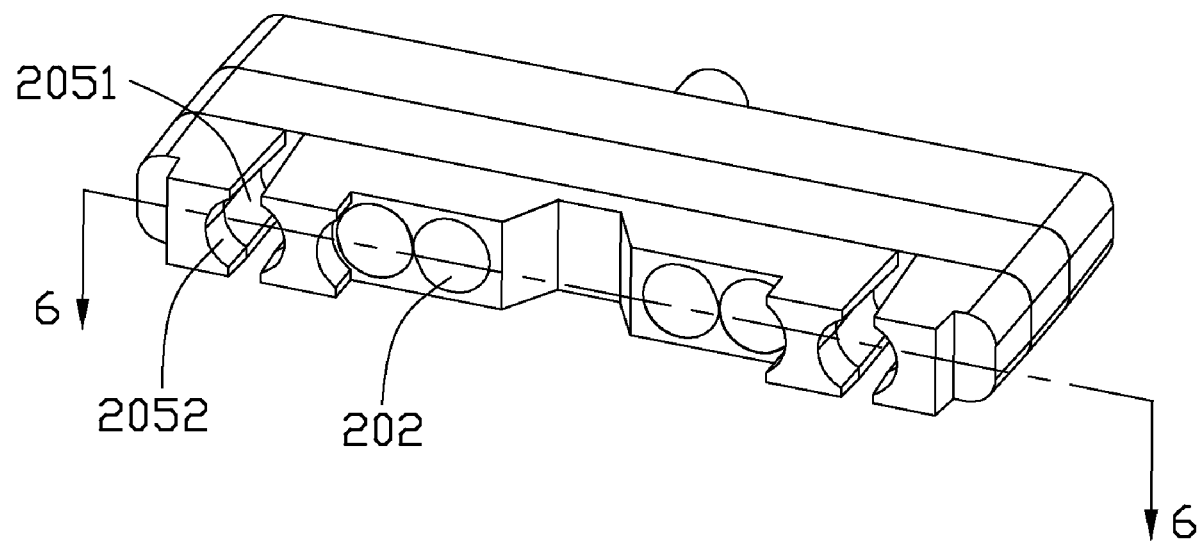
FIG. 5 is a perspective view of a first optical fiber connector shown in FIG. 1.
Figure 6:
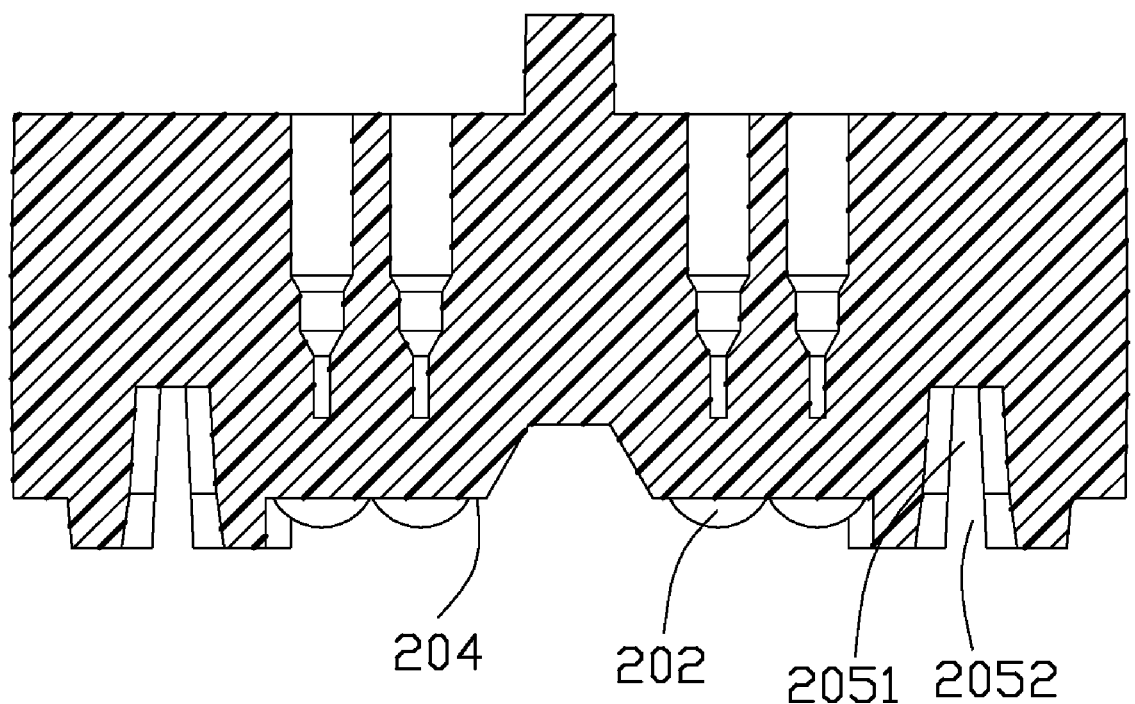
FIG. 6 is a cross sectional view of the first optical fiber connector shown in FIG. 5 taken along line 6-6.

Referring to FIG. 5 and FIG. 6, each of the positioning hole 205 of a cone shape runs through the second mating face 204 and includes a retention section 2051 adjacent to an inner rear face thereof and a guiding section 2052 in front of the retention section 2051. The guiding section 2052 is larger than the retention section 2051 in dimension, i.e., the cone angle of the guiding section 2052 is larger than that of the retention section 2051. Please notes, the retention sections end with and the guiding sections start from the mating face 204, i.e. a ring joint of the guiding section and the retention section is located in an imagine plane of the mating face 204. As a result, the joint ensure an acute engagement of the couple of said two connectors. Particularly, the retention sections 2051 have a same dimension with the positioning posts 105, i.e., the exterior face of the positioning post being intimately compliantly received within the retention section 2051 when the first mating portion 101 and the second mating portion 201 are fully mated with each other, while the guiding sections 2052 are larger than positioning posts 105 in dimension.

Figure 4:
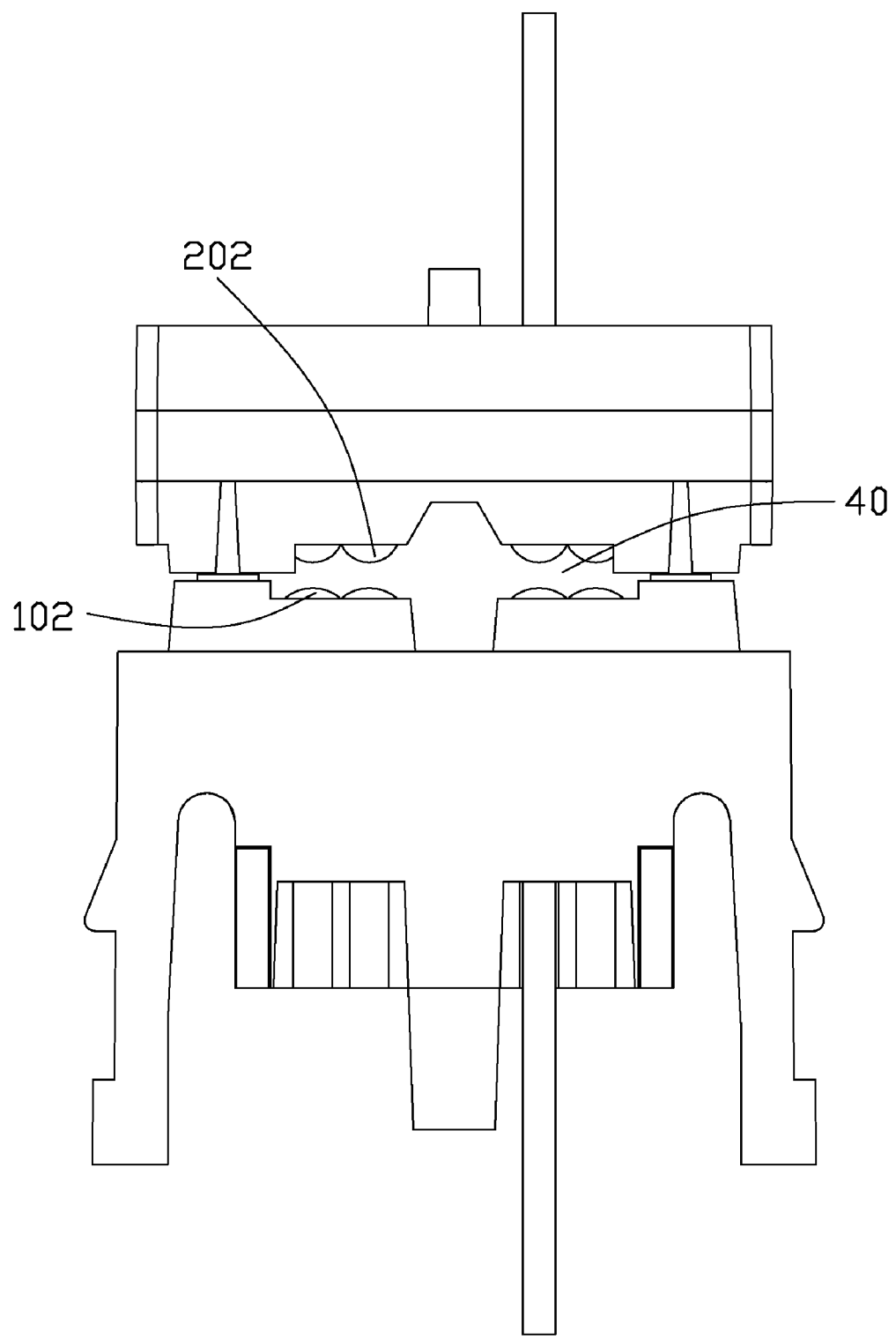
FIG. 4 is a top plane view of the optical fiber connector assembly shown in FIG. 3.

In assembly, the first connector 10 and the second connector 20 are mated with each other by the engagement of the positioning posts 105 and the positioning slots 205. Firstly, the positioning posts 105 are guided by the guiding sections 2051. Secondly, the positioning posts 105 are inserted into the retention sections 2051 and retained thereby. The guiding sections 2051 and the retention sections 2052 ensure the accurate mating between the first and second connector 10, 20. After assembly, a mating space 40 labeled in FIG. 4 is defined between the first and second connector 10, 20 to keep a certain distance between the corresponding first and second convex lenses 102, 202 for a better optical transmission.

It is to be understood, however, that even though numerous, characteristics and advantages of the present invention have been set fourth in the foregoing description, together with details of the structure and function of the invention, the disclosed is illustrative only, and changes may be made in detail, especially in matters of shape, size, and arrangement of parts within the principles of the invention to the full extent indicated by the broad general meaning of the terms in which the appended claims are expressed.

What is claimed is:

1. An optical fiber connector assembly comprising:
a first connector comprising two pairs of first convex lenses projecting from a front mating face thereof and a pair of cone-shaped positioning posts at sides of the pairs of convex lenses respectively;
a second connector comprising two pairs of second convex lenses projecting from second front mating face thereof to couple with the first convex lenses and a pair of positioning holes to be inserted with the positioning posts of the first connector;
wherein each of the positioning holes comprises a retention section and a guiding section in front of the retention section, the retention sections is same to the positioning posts while the guiding sections is larger than the position posts in dimension;
wherein the retention sections end at a position which is located in a same level to said first mating face in a front and back direction.

2. The optical fiber connector assembly as claimed in claim 1, wherein the positioning holes are of a cone shape.

3. An optical connector assembly comprising:
a first optical module for use within a first connector, and a second optical module for use within a second connector, said first optical module and said second optical module being mateable with each other,
said first optical module defining a plurality of first convex lenses, said second optical module defining a plurality of second convex lenses in respective intimate alignment with the corresponding first convex lenses during mating;
the first optical module defining a pair of cone-shaped positioning posts, and the second optical module defining a pair of positioning holes for coupling to the corresponding positioning posts, respectively, during mating; wherein
each of the positioning holes defines a front guiding section with a large tapered angle, and a rear retention section with a small tapered angle; wherein
the cone-shaped positioning post defines a tapered exterior face with the small tapered angle thereof for intimately compliantly received within the rear retention section when the first optical module and the second optical module are fully mated with each other.

4. The optical connector assembly as claimed in claim 3, wherein the positioning post essentially defines a constant tapered angle which is similar to that of the rear retention section of the corresponding positioning hole.

5. The optical connector assembly as claimed in claim 3, wherein said positioning hole communicates with an exterior not only axially but also diametrically on two opposite segments of a circumference thereof.

6. An optical connector adapted for being coupled with a counter optical connector which has a pair of positioning posts, the optical connector comprising:
a mating portion disposed in front of a base portion, the mating portion defining a step front face with a first front face and a second front face projecting forward beyond the first front face;
a plurality of convex lenses disposed at the first front face of the mating portion;
a pair of guiding holes running through the second front face for receiving said positioning posts of the counter optical connector;
wherein each of the guiding hole is composed of a front retention section with a large tapered angle and a rear retention section with a small tapered angle, a joint of the front guiding section and the rear retention section is located in an imagine plane of the first front face of the mating portion.

7. The optical connector as claimed in claim 6, wherein said guiding hole communicates with an exterior not only axially but also diametrically on two opposite segments of a circumference thereof.

* * * * *